United States Patent [19]
Bergh

[11] 3,727,838
[45] Apr. 17, 1973

[54] STEEL-CERAMIC RAILJOINT ENDPOST
[75] Inventor: Eugene H. Bergh, St. Paul, Minn.
[73] Assignee: Minnesota Mining and Manufacturing Company, Saint Paul, Minn.
[22] Filed: July 26, 1971
[21] Appl. No.: 166,203

[52] U.S. Cl. ................................................238/152
[51] Int. Cl. ........................E01b 11/58, E01b 26/00
[58] Field of Search......................238/122, 152, 218

[56] References Cited
UNITED STATES PATENTS 3,593,919  7/1971  Hamilton, Jr.........................238/152
3,312,399  4/1967  Cruikshank .........................238/152
3,528,609  9/1970  Mitgav ................................238/152

Primary Examiner—Robert G. Sheridan
Assistant Examiner—Richard A. Bertsch
Attorney—Alexander, Sell, Steldt & Delahunt

[57] ABSTRACT

An electrically insulating railjoint endpost having steel face plates and at least one high compressive strength thin insulating ceramic spacer sheet adhesively bonded on each face to steel face plates or steel filler plates. At least the edges are peripherally protected by a nonconducting polymeric coating, conveniently by coating of the entire endpost.

10 Claims, 3 Drawing Figures

PATENTED APR 17 1973

3,727,838

INVENTOR.
EUGENE H. BERGH
BY Kinney, Alexander,
Sell, Steldt & DeLaHunt
ATTORNEYS

STEEL-CERAMIC RAILJOINT ENDPOST

This invention relates to endposts for interposition between the ends of railroad rails which are to be mutually electrically insulated from one another for use in conjunction with block signal systems, etc.

It has been customary to use endposts composed of or comprising vulcanized fiber, or other filamentous material or of resilient electrically insulating compositions as described, for example, in U.S. Pat. No. 1,622,614; 2,808,995; 3,312,399; and 3,389,859. Such prior art endposts are subject to attrition in use because of the weathering and enormous forces to which they are subjected so that they become moisture absorptive and conductive and fail within a very short time; or, in the case of resilient materials, they are extruded from the joint by expansion of the rails at elevated temperatures. The present U.S. standard for the gaps at rail joints is ⅜ inch (9.5 mm.) which must be filled by the endpost. To a considerable extent, the gap is maintained by joint bars or fish plates bolted to and bridging the respective rail ends. Such a bar is advantageously of the insulating type described by Youngward et al., U.S. Pat. No. 3,369,752. Earlier, insulating joint bars were constructed of steel used with insulation between them and the rail and with insulating bushings surrounding the bolts.

One aim of this invention is to provide a railroad rail endpost which has insulating properties and is resistant to intense stress for protracted periods of time. Other aims and objects will become evident from the description and drawings herewith.

It has been found that laminated endposts are especially suitable for the aims of the invention which endposts include at least one ceramic sheet adhesively bonded to exterior steel face plates and/or, in some instances, also steel filler plates. The steel plates themselves may be laminated from several thinner plates.

Endposts of the invention are laminated to a thickness of at least 0.2 in. (about 5 mm.) and up to about 0.8 in. (about 20 mm.) and may conform in outline to any desired rail cross-section. Generally, thinner endposts are too easily short-circuited, and thicker gaps create excessive mechanical shock with the passing wheels. In the endposts of the invention, there are at least two, flat, smooth steel plates each at least 1/16 in. (1.5 mm.) in thickness and having a Rockwell C hardness of 35 – 50. Here and elsewhere herein, the term "flat" indicates planarity within a limit of about ± 0.01 in. (0.3 mm.) over the total height although greater deviation can sometimes be tolerated. Smoothness to a finish of about 100 CLA microinches or preferably about 20 CLA microinches or better is desirable for the ceramic. The surface of the steel is advantageously sand blasted to achieve cleanliness and improved adhesion. The use of primers may also enhance adhesion.

In addition to the steel plates, there is at least one flat, smooth, electrically insulating sheet of dense ceramic about 0.01 to about 0.15 in. (0.25 to 4.0 mm.) in thickness having a compressive strength of at least 100,000 p.s.i., (7,000 kg/cm$^2$) and preferably 250,000 p.s.i. (17,500 kg/cm$^2$) or higher; a modulus of elasticity of at least 2,000,000 p.s.i. (140,000 kg/cm$^2$) and preferably 15,000,000 p.s.i. (1,050,000 kg/cm$^2$) or higher; and an electrical resistance of at least $1 \times 10^9$ and preferably at least $1 \times 10^{11}$ ohm-cm. It should be noted that the ceramic lamina used need not be one sheet only, several pieces may be fitted together or a single sheet which has fractured is fully satisfactory.

The refractory ceramic sheets are bonded to steel plates by essentially void-free adhesive layers preferably of a thickness of not more than about 0.01 in. (0.3 mm.). In general, the minimum thickness of adhesive conveniently employed is about 0.002 in. (.05 mm.). Whatever adhesive is used is characterized by an overlap shear strength of at least 3,000 p.s.i. (210 kg/cm$^2$) as determined by ASTM method D–1002, and a T-peel resistance of at least 30 pounds per inch (5,400 g/cm.) as determined by ASTM method D–1876. The adhesives which are preferred are two-polymer adhesives normally available in sheet form as structural adhesives.

In addition to the steel plates and adhesively bonded ceramic sheets, a tough adherent, protective, electrically insulating coating is applied so as to cover at least the edges of the endpost. This protects the ceramic and steel and helps to avoid bridging of the insulating layers by conductive particles or splinters of iron which may be attracted because of magnetization of steel rails and the plates of the endpost itself due to repeated blows.

The steel may be of any type having the requisite hardness. Conveniently, a softer steel is shaped and then hardened. Actually, any metal having such hardness may be used and will generally be the equivalent. Nonmagnetizable metals such as stainless steels offer advantages in that the insulating casting is not necessary for additional avoidance of bridging by magnetic particles, but economic factors militate against the use of almost all metals other than steel. Slight irregularities in the steel are not significant. The surfaces of the steel are advantageously cleaned by sand blasting and primed to promote adhesion.

The ceramic is a dense, low porosity ceramic having the necessary compressive strength such as alumina of from 93 to 99.5 percent or higher purity. Titania, zirconia, steatite, spinel, beryllia, glasses and other ceramics may all be used when sufficiently dense and having the necessary compressive strength. Sheets of the desired characteristics are conveniently obtained following the teachings of Park, U.S. Pat. No. 2,966,719. Because the compressive strength of dense alumina is outstanding, it is preferred. Highly useful dense alumina ceramics having compressive strengths over 300,000 p.s.i. (21,000 kg/cm$^2$) in the forms of AlSiMag 771, AlSiMag 614 and AlSiMag 753 as well as ceramics of other types are available from American Lava Corp., Chattanooga, Tenn. The term "AlSiMag" is a Registered Trademark of the American Lava Corp.

As previously noted, the adhesives employed in bonding laminae have the criteria of overlap shear strength of at least 3,000 p.s.i. (210 kg/cm$^2$) and T-peel resistance of at least 30 pounds per inch (5,400 g/cm). The preferred two-polymer structural adhesives are described in some detail in "A Concise Guide to Structural Adhesives," W. H. Guttman editor, Reinhold Publishing Co., N.Y. (1961) and in "Adhesion and Adhesives," R. Houwink and G. Salomon, (2nd ed.) Vol. 1., Elsevier Publishing Co., Amsterdam, etc. (1965). Some useful types of nylon-epoxy adhesives are described by Frigstad, U.S. Pat. No. 3,449,280. Other useful types of adhesives include nitrile-epoxy and nitrile-phenolic.

The outer protective coating is conveniently an epoxy resin such as described by Winthrop and Skotnicki, U.S. Pat. No. 3,102,043. Other highly adherent, weather resistant or weatherproof coatings, which are equivalents, may also be used.

The invention is now further explained by reference to the drawings wherein.

Figure 1:
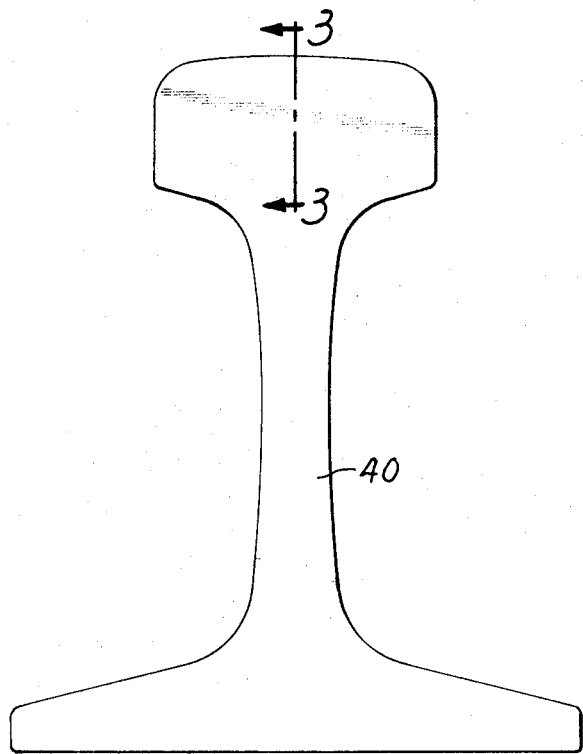
FIG. 1 is a face view at about ⅝ scale of an endpost of the invention for use with a typical American "132 lb. A.R.E.A." railroad rail.

Referring to the Figures, ceramic sheets 10 and 12, steel outer plates 20 and 22 and middle steel plate or filler 24 are adhesively bonded by thin adhesive layers 30, 32, 34 and 36 and the entire endpost is covered by coating 40. An especial advantage of endposts with two or more insulating layers of dense ceramic is that they are effectively two or more insulations so that if one insulation fails due to bridging etc., a further adequate insulation remains and the integrity of the system is maintained at least until the second insulation also fails. The probability of failure of the system is greatly reduced because the likelihood of two failures in one endpost is very low when four such endposts with eight insulating layers are involved in each block signal circuit.

Because of the immense forces necessary to test endposts of the invention, it is convenient to make small laminates of about 1 × 1 inch (25 × 25 mm.) for test purposes using steel squares hardened to Rockwell C hardness of 35 – 50 and of the thickness needed for the construction desired. A steel rail as shown in the figures has a cross-section of almost 13 square inches (84 sq.cm.).

Test pieces and endposts are made using two steel pieces 3/16 in. (4.7 mm.) thick with a core of dense alumina about 0.030 to 0.064 in. (0.75 to 1.6 mm.) thick using nylon-epoxy or epoxy-nitrile adhesive sheets about 0.01 in. (0.3 mm.) thick followed by curing the adhesive for about 1 hour at 130° C. These test pieces made using dense alumina insulating layers have excellent impact strength and do not fail under compression up to the limit of capacity of the testing machine available, about 150,000 p.s.i. (10,500 kg/cm²). Extrapolating to an endpost as shown in the figures with about 13 square inches of area (84 cm².) this is at least 1,930,000 pounds (880,000 kg) of compressive force.

Because the adhesive must be substantially void-free to prevent compression due to porosity, the steel surfaces are cleaned, for example, by sand blasting and are desirably primed with a suitable primer to promote uniform overall adhesion of the adhesive.

Figures 2, 3:
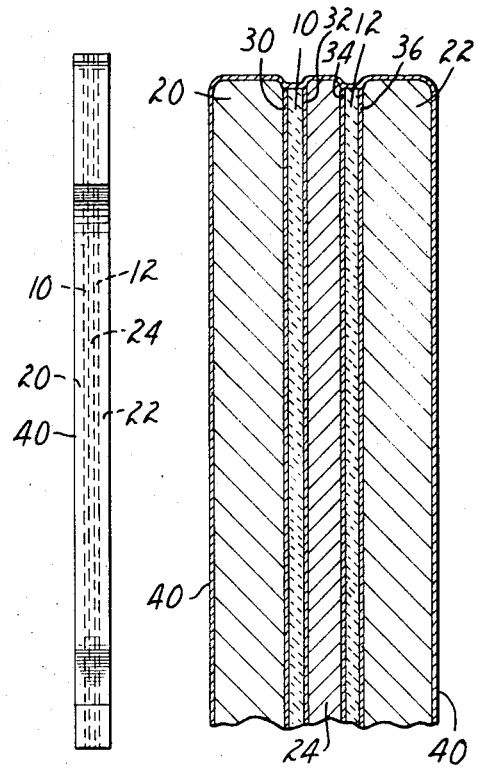
FIG. 2 is a side view at the same scale of the endpost of FIG. 1 (with coating broken away)
FIG. 3 is an enlargement to about four times natural size of the section 3—3 of FIG. 1.

Other test pieces and endposts are made using two ⅛ in. (3.2 mm.) steel outer pieces and a 1/16 in. (1.6 mm.) inner steel piece with two 0.032 in. (0.8 mm.) dense alumina sheets adhered with nylon-epoxy sheets or films. This is the type shown in FIGS. 1 – 3. These test endposts also have compressive strength above 100,000 p.s.i. (7,000 kg/cm²).

What is claimed is:

1. A laminated railroad endpost for electrically and mechanically separating two rail ends being about 0.2 to 0.8 in. thick and conforming to the outlines of said rail ends and comprising:
   A. at least two flat, smooth steel plates each at least about 1/16 inch in thickness and having a Rockwell C hardness in the range of 35 to 50,
   B. at least one flat, smooth, electrically insulating dense ceramic sheet about 0.01 to 0.15 in. in thickness conforming in outline to said steel plates and having a compressive strength of at least 100,000 p.s.i., a modulus of elasticity of at least 2,000,000 p.s.i., and an electrical resistivity of at least $1 \times 10^9$ ohm-cm., and
   C. essentially void-free layers of adhesive having overlap shear strength of at least 3,000 p.s.i. and T-peel resistance of at least 30 pounds per inch bonding successive ceramic sheets and steel plates into an integral laminate having exterior steel plates.

2. A laminated railroad endpost according to claim 1 additionally comprising a tough, adherent, protective, electrically insulating coating covering at least the edges of said laminated endpost.

3. A laminated railroad endpost according to claim 1 wherein the ceramic sheet is dense alumina of at least 93 percent purity.

4. A laminated railroad endpost according to claim 1 wherein adhesive layers are two-polymer structural adhesives.

5. A laminated railroad endpost according to claim 4 wherein adhesive layers are two-polymer nylon-epoxy sheets about 0.002 to 0.01 in. thick.

6. A laminated railroad endpost according to claim 4 wherein adhesive layers are two-polymer nitrile-epoxy sheets about 0.002 to 0.01 in. thick.

7. A laminated railroad endpost according to claim 4 wherein adhesive layers are two-polymer nitrile-phenolic sheets about 0.002 to 0.01 in. thick.

8. A laminated railroad endpost according to claim 1 wherein at least two insulating ceramic sheets are provided.

9. A laminated railroad endpost according to claim 1 wherein the tough adherent, protective electrically insulating coating covers the faces as well as the edges.

10. A laminated endpost according to claim 1 wherein the ceramic sheet is glass.

* * * * *

UNITED STATES PATENT AND TRADEMARK OFFICE
CERTIFICATE OF CORRECTION

PATENT NO. : 3,727,838

DATED : April 17, 1973

INVENTOR(S) : Eugene H. Bergh

It is certified that error appears in the above-identified patent and that said Letters Patent are hereby corrected as shown below:

Column 4, Claim 9, line 51, "1" should read -- 2 --.

Signed and Sealed this

Twentieth Day of June 1978

[SEAL]

Attest:

RUTH C. MASON
Attesting Officer

DONALD W. BANNER
Commissioner of Patents and Trademarks